Feb. 23, 1965  H. E. ROSENBERGER ETAL  3,170,984
ZOOM OPTICAL SYSTEM
Filed May 29, 1961  2 Sheets-Sheet 1
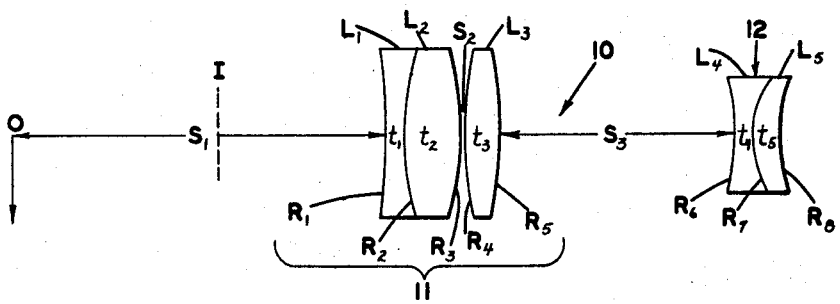
FIG. 1
| ZOOM SYSTEM | | MAGNIFICATION RANGE = 12:1 | | | $n_D$ | $\nu$ |
|---|---|---|---|---|---|---|
| LENS | RADIUS | THICKN'S | SPACINGS | | | |
| $L_1$ | $R_1 = -177.01$ | $t_1 = 2.5$ | $S_1$ | = 63.395 at 1.2 X | 1.720 | 29.3 |
| | $R_2 = 37.67$ | | | = 46.901 at 14.4 X | | |
| $L_2$ | $R_3 = -37.67$ | $t_2 = 7.8$ | | | 1.498 | 67.0 |
| $L_3$ | $R_4 = 53.45$ | $t_3 = 4.5$ | $S_2$ | = 0.3 | 1.517 | 64.5 |
| | $R_5 = -65.46$ | | | | | |
| $L_4$ | $R_6 = -50.58$ | $t_4 = 2.6$ | $S_3$ | = 18.835 at 1.2 X | 1.517 | 64.5 |
| | $R_7 = 16.14$ | | | = 160.731 at 14.4 X | | |
| $L_5$ | $R_8 = 27.04$ | $t_5 = 3.2$ | | | 1.720 | 29.3 |
FIG. 2
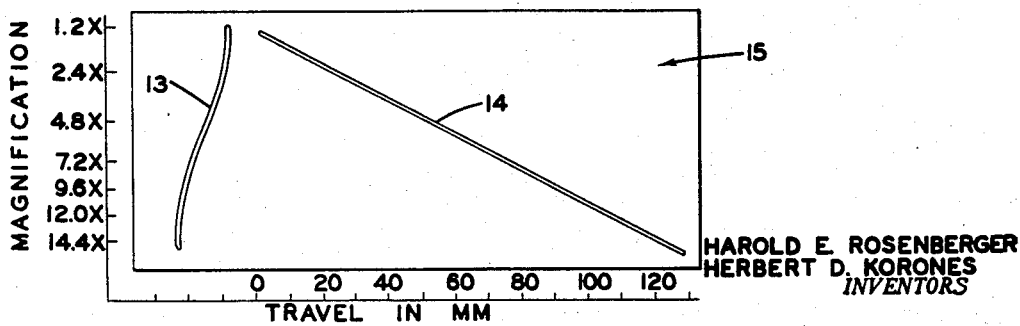
FIG. 3
HAROLD E. ROSENBERGER
HERBERT D. KORONES
*INVENTORS*
BY *Frank C. Parker*
ATTORNEY

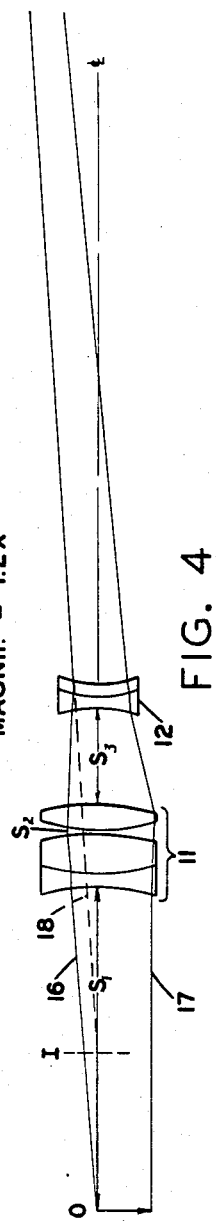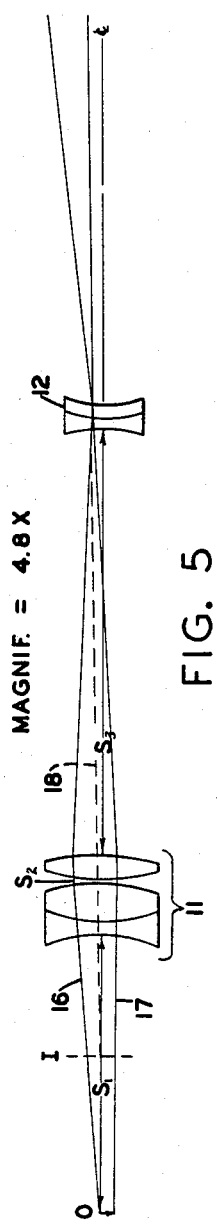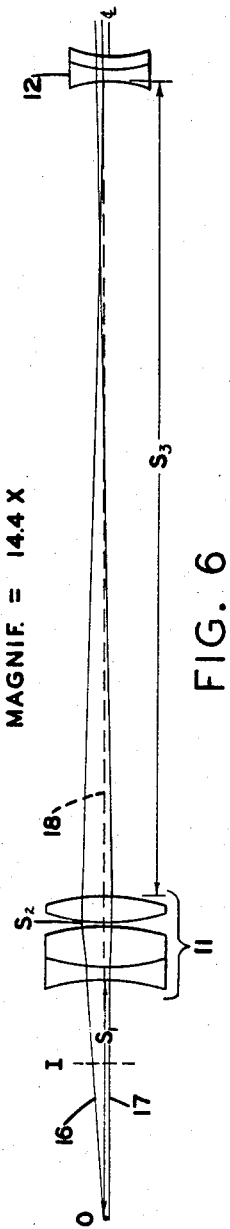

United States Patent Office 3,170,984
Patented Feb. 23, 1965

---

3,170,984
ZOOM OPTICAL SYSTEM
Harold E. Rosenberger, Brighton, and Herbert D. Korones, Rochester, N.Y., assignors to Bausch & Lomb Incorporated, Rochester, N.Y., a corporation of New York
Filed May 29, 1961, Ser. No. 113,474
5 Claims. (Cl. 88—57)

The present invention relates to optical systems and more particularly relates to improvements in zoom type of pancratic optical systems.

In recent years, lens designers have developed a number of zoom type of pancratic optical systems for use on various kinds of optical apparatus and generally these systems are very complex in structure and high in cost whenever high grade imagery is achieved. For many purposes the magnification range is found to be too limited, particularly when superior imagery is demanded along with a large magnification range.

It is an object of the present invention to provide a novel zoom type of pancratic optical system which produces a virtual image of an object at a stationary position, said system being corrected in a superior manner for all chromatic and monochromatic image aberrations as well as distortion and flatness of field.

Another object of this invention is to provide such a device having an extraordinarily large magnification range of 12:1 or more without sacrificing any of the aforementioned desirable optical characteristics.

A still further object is to provide such a zoom optical system having utmost structural and optical simplicity consistent with superior optical performance and low cost.

Further objects and advantages of this invention will be found in the form and arrangement and in the details of structure of the parts thereof by reference to the specification herebelow when studied in connection with the accompanying drawings in which;

FIG. 1 is an optical diagram showing a preferred form of the present invention,

FIG. 2 is a table of constructional data which is related to the optical system in FIG. 1;

FIG. 3 is a chart which is explanatory of certain features of this invention,

FIG. 4 is an optical diagram of this invention showing one operative position thereof, and FIGS. 5 and 6 are further optical diagram showing other operative positions thereof.

An optical system generally indicated by numeral 10 is shown in FIG. 1 of the drawing, according to a preferred form of the present invention.

According to this invention, said system 10 comprises a front lens member 11 of positive power and a rear lens member 12, of negative power which cooperatively produce a virtual image I of an object O, said image being formed in the space $S_1$ at a stationary position between the object O and the lens member 11. Mechanical means, not shown, are provided for mounting members 11 and 12, for axial motion, and for moving said members differentially and simultaneously as shown in FIG. 3 with respect to any fixed point on their optical axis so that the virtual image I may be continuously varied in size at said stationary position throughout a range of magnification of 12:1 or more.

The optical construction of the lens system 10, is especially designed for an extended range of magnification beyond 12:1 if desired and this useful property of the system is achieved along with other high grade features such as a superior correction for all chromatic and monochromatic image aberrations as well as coma, astigmatism, distortion and flatness of field. The front lens member 11 has a positive focal length $F_1$ and the rear lens member 12 has a negative focal length $F_2$ per se which is numerically expressed by the inequality, $$.85F_1 < -F_2 < .95F_1$$

The variable space $S_1$ between the member 11 and the object changes throughout the zoom range and at the terminal ends of its travel it has the values given herebelow.

$$1.25F_1 < S_1 < 1.55F_1 \text{ (at } 1.2\times\text{)}$$
$$.90F_1 < S_1 < 1.20F_1 \text{ (at } 14.4\times\text{)}$$

Likewise, the space $S_3$ between the lens member 11 and member 12 changes throughout the zooming action, varying as shown diagrammatically in FIG. 3.

In the preferred form of the invention as shown in FIG. 1, the front lens member 11 comprises a compound meniscus lens consisting of a double concave element $L_1$ and a double convex element $L_2$ located in contact with its rear concave surface. The positive focal length of the meniscus lens ($L_1$, $L_2$) has a value between $5.0F_1$ and $6.0F_1$. Further comprised in said front lens member 11 is a double convex single lens $L_3$ located rearwardly of said meniscus lens and having a positive focal length which is between $1.2F_1$ and $1.4F_1$. Lens $L_3$ is spaced a fixed distance $S_2$ rearwardly of the meniscus lens ($L_1$, $L_2$), $S_2$ having a value between $.004F_1$ and $.11F_1$.

The aforesaid rear lens member 12 is preferably composed of a double concave lens element $L_4$ having contact rearwardly with a meniscus element $L_5$, the interface $R_7$ therebetween being convex toward the front.

Regarding the compound front lens ($L_1$, $L_2$), the radius of the first lens surface $R_1$ should have a value between $2.0\times$ and $2.7\times$ the sum of the radii of the next two lens surfaces $R_2$ and $R_3$. Furthermore the sum of the radii of the front and back lens surfaces $R_4$ and $R_5$ respectively of lens $L_3$ should be between $1.54\times$ and $1.62\times$ the sum of the radii $R_2$ and $R_3$. With regard to the rear lens member 12, the front surface $R_6$ thereof should have a radius equal to between $1.5\times$ and $2.0\times$ the radius of the rear surface $R_8$.

A more complete statement of constructioned data for the optical system which satisfies the requirements of the present invention is given in the table herebelow, wherein $R_1$ to $R_8$ are the radii of the successive lens surfaces, $t_1$ to $t_5$ are the axial thicknesses of the successive lens elements $L_1$ to $L_5$, $S_1$ to $S_3$ are the spaces between the lenses and $nD$ and $\nu$ are respectively the refractive index and the Abbe number respectively of the glasses in said elements.

$$3.80F_1 < -R_1 < 4.06F_1$$
$$.73F_1 < +R_2 < .91F_1$$
$$.73F_1 < -R_3 < .91F_1$$
$$1.0F_1 < +R_4 < 1.28F_1$$
$$1.3F_1 < -R_5 < 1.57F_1$$
$$1.0F_1 < -R_6 < 1.2F_1$$
$$.32F_1 < +R_7 < .39F_1$$
$$.53F_1 < +R_8 < .67F_1$$
$$.050F_1 < t_1 < .061F_1$$
$$.155F_1 < t_2 < .190F_1$$
$$.089F_1 < t_3 < .110F_1$$
$$.051F_1 < t_4 < .067F_1$$
$$.065F_1 < t_5 < .078F_1$$
$$1.25F_1 < S_1 < 1.55F_1 \text{ (least } m\text{)}$$
$$.90F_1 < S_1 < 1.20F_1 \text{ (highest } m\text{)}$$
$$.004F_1 < S_2 < .11F_1$$
$$.37F_1 < S_3 < .47F_1 \text{ (least } m\text{)}$$
$$3.50F_1 < S_3 < 3.64F_1 \text{ (highest } m\text{)}$$
$$1.717 < N_D(1) < 1.723$$
$$1.496 < N_D(2) < 1.500$$
$$1.515 < N_D(3) < 1.519$$

$1.515 < N_D(4) < 1.519$
$1.717 < N_D(5) < 1.723$
$28.9 < \nu(1) < 29.7$
$66.0 < \nu(2) < 68.0$
$63.5 < \nu(3) < 65.5$
$63.5 < \nu(4) < 65.5$
$28.9 < \nu(5) < 29.7$ wherein $F_1$ denotes the focal length of the first lens member 11, and $m$ denotes the magnification of the object cooperatively produced by the two lens members 11 and 12.

The constructional data for one successful form of the present invention is given specifically in the table herebelow and as shown in FIG. 2 of the drawing wherein the symbols R, $t$, S, etc. are the same as specified in the foregoing table, and F.L. designates the focal lengths of the lenses $L_1$ to $L_5$.

Zoom system
[Magnification range=12:1]

| Lens | Radius | F.L. | Thickness | Spaces | $n_D$ | $\nu$ |
|---|---|---|---|---|---|---|
| $L_1$ | $R_1 = -177.01$ | $-42.9$ | $t_1 = 2.5$ | $S_1 \begin{cases} =63.395 \text{ at } 1.2\times \\ =46.901 \text{ at } 14.4\times \end{cases}$ | 1.720 | 29.3 |
| $L_2$ | $R_2 = 37.67$ | $+39.2$ | $t_2 = 7.8$ | | 1.498 | 67.0 |
|  | $R_3 = -37.67$ | | | $S_2 = 0.3$ | | |
| $L_3$ | $R_4 = 53.45$ | $+57.7$ | $t_3 = 4.5$ | | 1.517 | 64.5 |
|  | $R_5 = -65.46$ | | | $S_3 \begin{cases} =18.835 \text{ at } 1.2\times \\ =160.731 \text{ at } 14.4\times \end{cases}$ | | |
| $L_4$ | $R_6 = -50.58$ | $-23.4$ | $t_4 = 2.6$ | | 1.517 | 64.5 |
| $L_5$ | $R_7 = 16.14$ | $+49.6$ | $t_5 = 3.2$ | | 1.720 | 29.3 |
|  | $R_8 = 27.04$ | | | | | |

The operation of a zoom optical system constructed according to the above specified optical data is best understood by reference to FIGS. 4, 5 and 6 of the drawing wherein ray traces are shown for two typical rays, 16 and 17. As here shown, the axial positions of the movable lens members 11 and 12 are shown for three image magnifications which are 1.2× (FIG. 4), 4.8× (FIG. 5) and 14.4× (FIG. 6) corresponding to the motions indicated in the curves 13 and 14 of FIG. 3. Similarly to FIG. 1, the object O is shown at the left of the optical diagram and as indicated by the dotted lines 18, the lens members 11 and 12 form a virtual image I, shown in dotted lines also, at an axially fixed position. As the lens members are simultaneously moved through their excursions, the virtual image remains fixed in position at I while the magnification of said image goes through the range of 12:1. The sizes and positions of the lens members 11 and 12 are chosen so that the image I remains of constant size throughout the zoom range, the observed area of the object O decreasing as the magnification of the system is increased. The system thus presents an image of constant size which may be projected or visually observed through the use of suitable auxiliary optical systems (not shown).

Given herebelow is a table wherein the spaces $S_1$ and $S_3$ are specified for the aforementioned magnification range of 12:1 as related to the optical system 10.

| Zoom Power | $S_1$ | $S_3$ |
|---|---|---|
| 1.2 | 63.395 | 18.835 |
| 2.4 | 61.970 | 48.217 |
| 3.6 | 57.746 | 68.102 |
| 4.8 | 54.983 | 83.678 |
| 6.0 | 53.027 | 96.819 |
| 7.2 | 51.554 | 108.365 |
| 8.4 | 50.393 | 118.769 |
| 9.6 | 49.449 | 128.309 |
| 10.8 | 48.660 | 137.164 |
| 12.0 | 47.989 | 145.462 |
| 13.2 | 47.409 | 153.294 |
| 14.4 | 46.901 | 160.731 |

It should be emphasized at this point that the zoom optical system 10 as above described is not limited to a zoom range of 12:1 as mentioned in connection with one form of this invention, but the range may be extended considerably without structural changes in the optical parts and without sacrificing any of the superior optical performance stated in the objects of this invention.

Although only a preferred form of this invention has been shown and described in detail, changes may be made in the details of construction and form of the parts and substitutions may be made therein without departing from the spirit of the invention as claimed in the appended claims.

We claim:

1. A zoom type of pancratic optical system corrected for chromatic and monochromatic image aberrations and having a substantially flat field, said system comprising a front lens member which consists of a compound meniscus lens which is concave on the object side and has a positive focal length of between $5.0F_1$ and $6.0F_1$ where $F_1$ is the focal length of the front member and is composed of a front double concave element having its surface of strongest curvature in contact with a rear double convex element and further includes a double convex lens spaced a fixed distance rearwardly thereof and having a positive focal length of between $1.2F_1$ and $1.4F_1$, said system comprising a double concave compound rear lens member which is optically aligned rearwardly of the front member and has a negative focal length which is substantially $.91F_1$ and which is composed of a front double concave element having its surface of strongest curvature forming an interface with a rear convex-concavo element wherein the concavo surface is rearmost and has weaker curvature than the interface, said members being movable with respect to a fixed point on their common optical axis simultaneously and continuously at different rates so as to form a virtual image of continuously variable size of an object at a stationary position on said axis through a magnification range of greater than 4:1, and said members being spaced apart a distance between $.37F_1$ and $.47F_1$ when the system produces least magnification and being spaced apart a distance between $3.5F_1$ and $3.64F_1$ when the system produces highest magnification, the space between the object and the front member being correspondingly between $1.25F_1$ and $1.55F_1$ when the system produces least magnification and between $.90F_1$ and $1.20F_1$ when the system produces the greatest magnification.

2. A zoom type of pancratic optical system as set forth in claim 1 wherein said meniscus lens is formed of a double concave front element and a double convex rear element and further characterized by lens radii which have numerical values as given herebelow:

$2.0(R_2+R_3) < R_1 < 2.7(R_2+R_3)$
$1.54(R_2+R_3) < R_4+R_5 < 1.62(R_2+R_3)$ the radius of the front surface of said negative member being between 1.5 and 2.0 times the radius of the rear surface of said negative member, wherein $R_1$ to $R_5$ designate the radius of the lens surfaces named in order in the front lens member.

3. A zoom type of pancratic optical system as set forth in claim 1 wherein said meniscus lens is formed of a double concave front element and a double convex rear element, and said rear member is formed of a front double concave element and a rear meniscus element, the constructional data for said system being given in the table of inequalities herebelow:

$3.80F_1 < -R_1 < 4.06F_1$
$.73F_1 < +R_2 < .91F_1$
$.73F_1 < -R_3 < .91F_1$
$1.0F_1 < +R_4 < 1.28F_1$
$1.3F_1 < -R_5 < 1.57F_1$
$1.0F_1 < -R_6 < 1.2F_1$
$.32F_1 < +R_7 < .39F_1$
$.53F_1 < +R_8 < .67F_1$
$.050F_1 < t_1 < .061F_1$
$.155F_1 < t_2 < .190F_1$
$.089F_1 < t_3 < .110F_1$
$.051F_1 < t_4 < .067F_1$
$.065F_1 < t_5 < .078F_1$
$1.25F_1 < S_1 < 1.55F_1$ (least $m$)
$.90F_1 < S_1 < 1.20F_1$ (highest $m$)
$.004F_1 < S_2 < .11F_1$
$.37F_1 < S_3 < .47F_1$ (least $m$)
$3.5F_1 < S_3 < 3.64F_1$ (highest $m$)

$1.717 < n_D(1) < 1.723$
$1.496 < n_D(2) < 1.500$
$1.515 < n_D(3) < 1.519$
$1.515 < n_D(4) < 1.519$
$1.717 < n_D(5) < 1.723$
$28.9 < \nu(1) < 29.7$
$66.0 < \nu(2) < 68.0$
$63.5 < \nu(3) < 65.5$
$63.5 < \nu(4) < 65.5$
$28.9 < \nu(5) < 29.7$ the numerals 1 to 5 designating the successive component lens elements named in order from the front of the system, $R_1$ to $R_8$ denote the radii of the respective lenses, the radius $R_2$ being related to a cemented lens interface $t_1$ to $t_5$ denote the thicknesses of the successive lens elements, $S_1$ represents the axial space between the object and the first lens, and $S_2$ and $S_3$ represent the successive spaces between the lenses, $n_D$ represents the refractive index and $\nu$ represents the Abbe number of the glass in the respective lens elements, and $m$ signifies the magnification of the image.

4. A zoom type of pancratic optical system comprising a front lens member of positive power and a rear lens member of negative power optically aligned therewith, the front member consisting of three lens elements and the rear member consisting of two elements, said members being movable axially simultaneously and continuously relative to a fixed point on the axis so as to form a virtual image of variable size at a stationary position along the axis of an object, the constructional data therefor being given in the table herebelow wherein $L_1$ to $L_5$ designate the successive lens elements in order from the front, $R_1$ to $R_8$ denote the radii of the lens surfaces, F.L. designates the focal length, $t_1$ to $t_5$ denote the thicknesses of the lens elements, $S_1$ represents the axial space between the object and the first lens, and $S_2$ and $S_3$ represent the successive axial spaces between the lenses, and $n_D$ and $\nu$ represent the refractive index and Abbe number respectively of the glass from which said elements are made,

Zoom system

[Magnification range=12:1]

| Lens | Radius | F.L. | Thickness | Spaces | $n_D$ | $\nu$ |
|---|---|---|---|---|---|---|
| $L_1$ | $R_1 = -177.01$ | $-42.9$ | $t_1 = 2.5$ | $S_1 \begin{cases} =63.395 \text{ at } 1.2\times \\ =46.901 \text{ at } 14.4\times \end{cases}$ | 1.720 | 29.3 |
| $L_2$ | $R_2 = 37.67$ | $+39.2$ | $t_2 = 7.8$ | | 1.498 | 67.0 |
| | $R_3 = -37.67$ | | | $S_2 = 0.3$ | | |
| $L_3$ | $R_4 = 53.45$ | $+57.7$ | $t_3 = 4.5$ | | 1.517 | 64.5 |
| | $R_5 = -65.46$ | | | $S_3 \begin{cases} =18.835 \text{ at } 1.2\times \\ =160.731 \text{ at } 14.4\times \end{cases}$ | | |
| $L_4$ | $R_6 = -50.58$ | $-23.4$ | $t_4 = 2.6$ | | 1.517 | 64.5 |
| $L_5$ | $R_7 = 16.14$ | $+49.6$ | $t_5 = 3.2$ | | 1.720 | 29.3 |
| | $R_8 = 27.04$ | | | | | |

5. A zoom optical system according to claim 3 wherein the rear surface of the front double concave element, and the front and rear surfaces of the double convex element all have the same radius.

References Cited in the file of this patent

UNITED STATES PATENTS 2,844,996    Klemt _____ July 29, 1958

UNITED STATES PATENT OFFICE
CERTIFICATE OF CORRECTION

Patent No. 3,170,984            February 23, 1965

Harold E. Rosenberger et al.

It is hereby certified that error appears in the above numbered patent requiring correction and that the said Letters Patent should read as corrected below.

Column 5, line 19, for "$.32F_1<+F_7<.39F_1$" read -- $.32F_1<+R_7<.39F_1$ --.

Signed and sealed this 17th day of August 1965.

(SEAL)
Attest:

ERNEST W. SWIDER            EDWARD J. BRENNER
Attesting Officer            Commissioner of Patents